Nov. 7, 1939.  W. R. DUDA  2,178,628
THRUST BEARING FOR ROLLING MILLS
Filed March 8, 1934  5 Sheets-Sheet 5

INVENTOR
Wentzel R. Duda
By Green & McCallister
His Attorneys

Patented Nov. 7, 1939

2,178,628

UNITED STATES PATENT OFFICE 2,178,628

THRUST BEARING FOR ROLLING MILLS

Wentzel R. Duda, Pittsburgh, Pa., assignor to Mackintosh-Hemphill Company, a corporation of Pennsylvania Application March 8, 1934, Serial No. 714,555

8 Claims. (Cl. 80—56)

This invention provides as a solution of the problem of rolling rounds and other shapes to close tolerances an arrangement of adjustable thrust resisting mechanism for taking axial thrust upon a roll or rolls of the mill stand and for axially adjusting the relative positions of the rolls of the roll pass to true the same for more accurate rolling.

In rolling with formed passes, the accuracy of the product depends of course on the shape of the pass in the rolls. The pass necessarily does not embrace the entire periphery of the material as it is being rolled; and the contour of the pass is carefully calculated so as to insure that the amount of widening or spread is just sufficient to give a finished product accurate in cross section. But no matter how accurately the contour of the pass is calculated, the product does not have the correct contour unless the grooves in the opposed rolls remain accurately in register during rolling.

The need for preventing axial movement of the rolls during rolling has not heretofore been adequately appreciated. The end thrust which arises in the course of the rolling operation has been taken care of heretofore by providing the roll neck brasses with a flange which is held against a bearing or bearing rider. The outer surface of the flange thus forms a thrust collar. Dirt and grit has free access to this thrust bearing and wear rapidly takes place. Even when the installation is first made there is sufficient play between the flange of the roll neck brass and the bearing or bearing rider so as to permit the roll to float longitudinally of its axis in the roll neck brasses. This of course permits the groove or grooves in one roll to move laterally out of alignment with the groove or grooves in the other roll of the pass, the result being a loss of trueness in the product rolled.

In accordance with my invention I provide, as above pointed out, an arrangement of adjustable thrust resiting mechanism which so cooperates with a roll or rolls of the mill stand as to change axially the relative positions of the rolls of the roll pass when necessary to true the same for more accurate rolling. I furthermore provide a housing for the bearing surfaces of the thrust resisting mechanism so that dirt and grit is excluded and excessive wear prevented.

The arrangement which I find most reliable is to fix the support for each thrust resisting mechanism to a mill housing. This makes the mill housing the fixed or base point relative to which I adjust the position of the thrust surfaces of this mechanism, and accordingly move the roll to be adjusted along its axis relative to the mill housing. When installation of the rolls in the mill housing is made, the radial bearings for the roll necks are positioned approximately in the relation which is selected for rolling the product desired, and the support for the thrust resisting mechanism is then fixed in position with the center line of the mechanism in proper alignment with the center line of the roll.

The mounting of the thrust resisting mechanism in fixed relation to the roll housing complicates to a certain extent the structure of this mechanism, since there are certain factors requiring vertical movement of the roll necks to some slight extent. The original spacing of the rolls is only approximate, as the correct spacing is customarily obtained by starting rolling operations, calipering the rolled material as it comes from the mill stand, and making such adjustments in the spacing of the rolls as is necessary to bring about or maintain a proper contour of the roll pass as the pass heats up and the metal of the rolls expands. Moreover, wear may and generally does occur to some extent in the radial bearings for the roll necks.

In accordance with my invention I provide radial clearance in the thrust resisting mechanism so as to provide for limited changes in the spacing of the center lines of the rolls.

Incident to the provision of such clearance there arises the problem of establishing proper alignment between the center line of the thrust bearing mechanism and the center line of the roll neck when the support for the thrust bearing mechanism is to be fixed to the mill housing. In accordance with my invention I provide for temporarily centering the mechanism and the roll neck until the mounting of the thrust resisting mechanism can be made secure to the mill housing. Thereafter, the temporary centering means can, if desired, be retracted.

In the drawings which are illustrative of two embodiments which my invention may assume:

Figure 1:
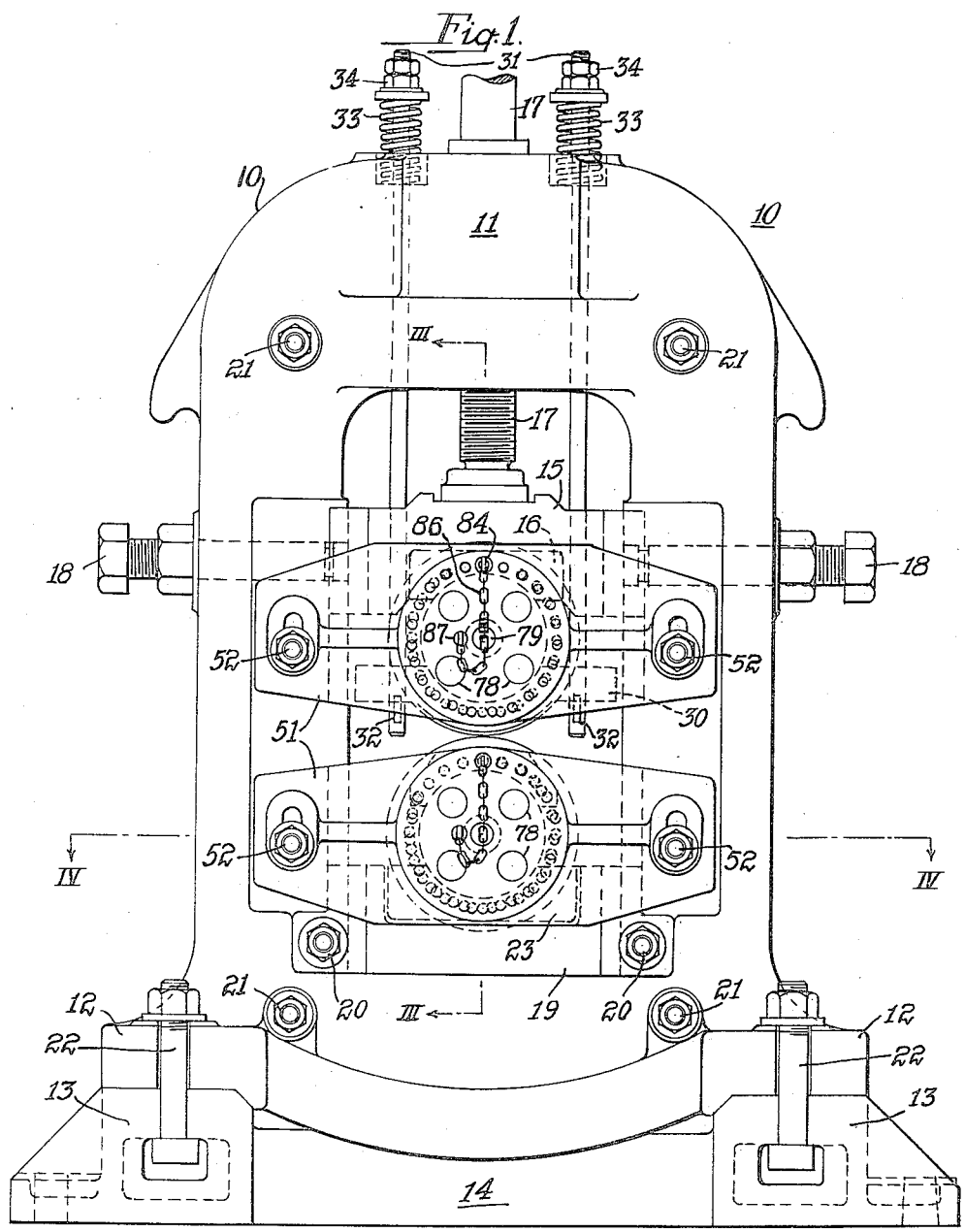
Figure 1 is an end view in elevation of a rolling mill employing my invention.

In carrying out my invention, the maximum clearance is determined in any or all directions that may be needed during the rolling procedure. I consider such clearance as is necessary to permit take-up of the radial bearings of a roll when worn within ordinary limits, before the need of their replacement arises. This is the take-up ordinarily accomplished by the screwdowns. I support the roll in mill housings in such a manner that the desired movement may be accomplished and/or permitted in the directions intended when the thrust bearing housing is mounted to form an absolutely stationary part of the mill.

In my invention it is not necessary to permit any slide or clearance between the thrust housing and its main support roll housing, but the former may be and is rigidly secured to the latter.

In my invention a change in the positioning of the roll neck is taken care of without providing any sliding clearance between the thrust housing and the main housing. Necessary clearance is taken care of within the thrust apparatus itself. And, due to the form and size of the parts employed, and also in view of the relative stresses to which they are subjected, I have been able accurately to finish the parts where sliding freedom is necessary and to operate such sliding parts in a total enclosed closure which permits such parts to function in a bath of lubricant, as distinguished from the previous methods where the main housing parts and the thrust bearing parts were exposed and necessarily had dry fits. As a result, the amount of clearance necessary to prevent a bind is relatively less. This in itself materially betters the tolerances and quality of a shape rolled within a mill employing my invention.

I further provide apparatus within the thrust bearing housing which automatically centers or otherwise axially aligns the thrust bearing parts with respect to the roll neck and its thrust flange.

In the illustrative embodiments of my invention shown in the drawings, the numeral 10 designates a mill or stand having a pair of oppositely positioned frames or housings 11 and 11'. I have also shown upper and lower working rolls 40 and 40a that are adjustably mounted in windows of the frames or housings 11 and 11' and are driven through couplings 41 by driving spindles 42.

Figure 2:
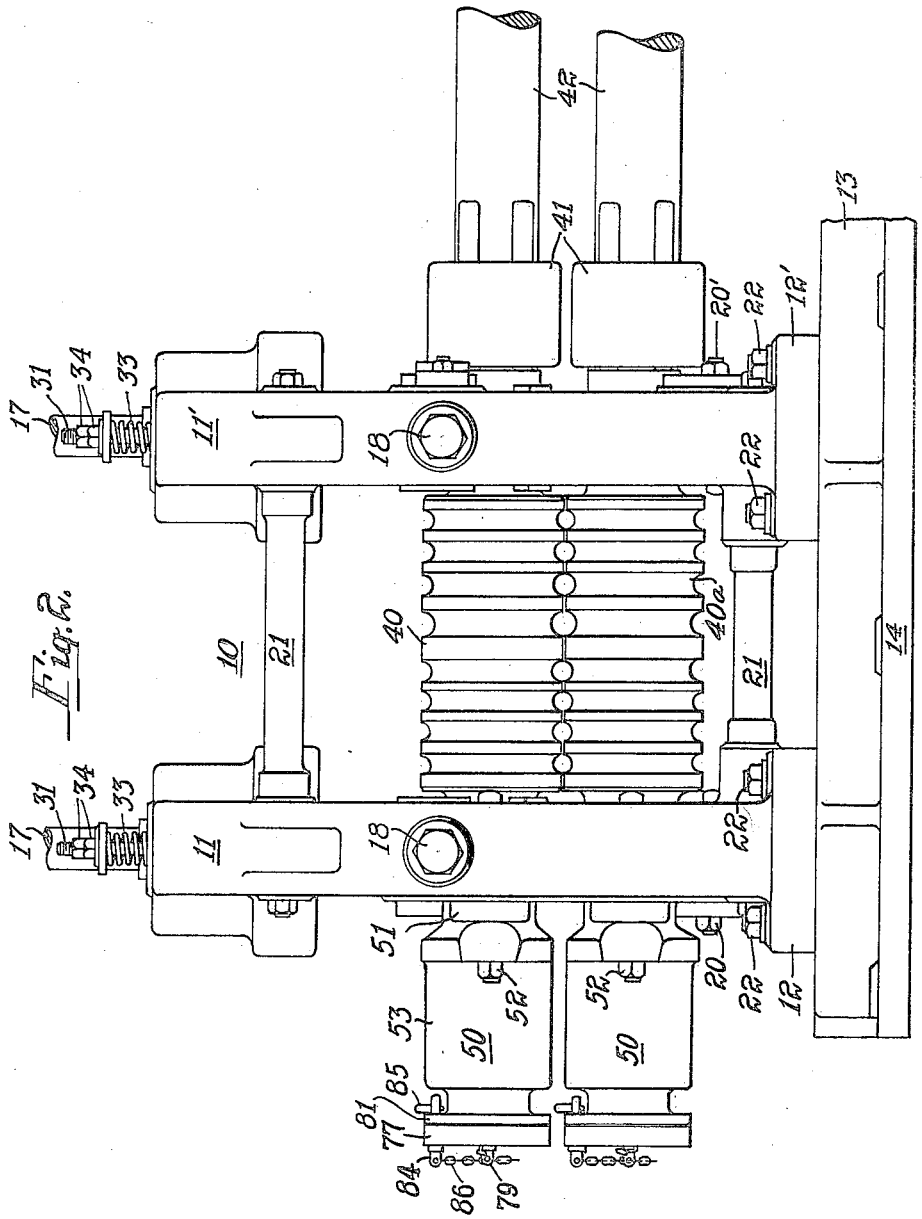
Fig. 2 is a reduced side view in elevation of the embodiment of Figure 1.

Since the general construction of the radial bearings for the roll necks is substantially the same in both mill housings, I will endeavor to simplify the description by referring only to what may be designated the left frame structure of the showing of Figure 2.

The supporting mechanism for the upper and lower rolls 40 and 40a, respectively, may be of conventional design. I have shown a top roll carrier brass 30 (see Figs. 1 and 3) for the lower portion of the roll neck 43 which may be suspended in the usual manner from the top of the housing 11 by a suitable pair of suspension rods 31 that are resiliently and adjustably hung therefrom by means of balance springs 33 and adjustment bolts 34.

As shown in Fig. 1, the top portion of the roll neck is also provided with the usual form of rider 15, which has a top roll brass 16; the rider is slidably mounted in the upper portion of the window of the housing 11. A screwdown 17 has been provided for vertical adjustment of the top roll; and, oppositely-positioned adjusting screws 18 extend inwardly from opposite edges of the housing 11 for adjustably controlling the transverse setting of the top roll 40. The neck of the bottom roll 40a is supported in the usual manner by a chuck 19 that is held in position by bolts 20. In order to journal the roll neck 43a of the bottom roll 40a, the chuck 19 carries a bottom roll brass 23.

Figure 4:
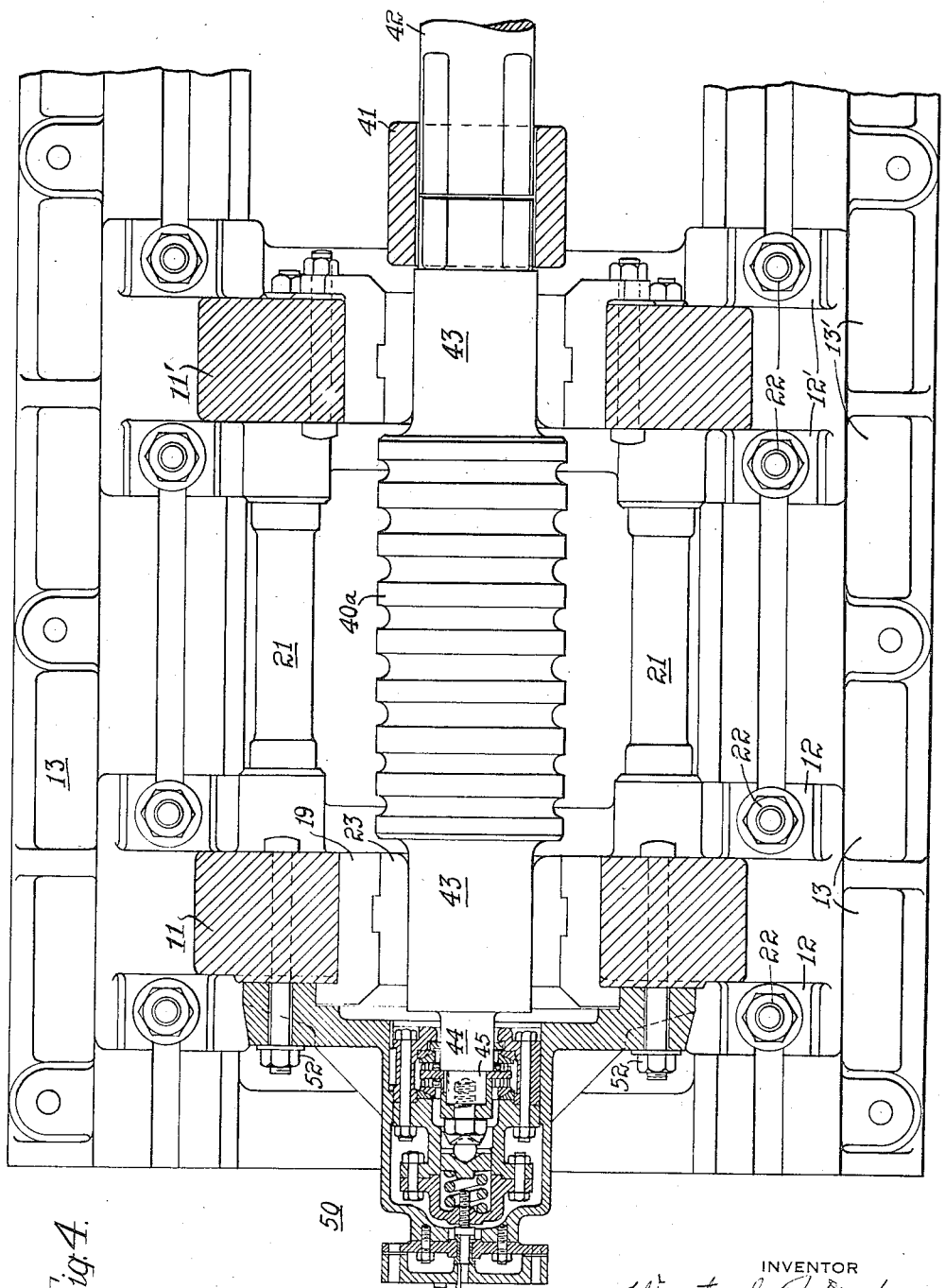
Fig. 4 is a horizontal section taken along the line IV—IV of Fig. 1.

From Figs. 1 and 4, it will appear that the oppositely-positioned frames 11 and 11' of the stand 10 are held in a spaced relationship with respect to each other by longitudinally or horizontally extending upper and lower spacer or tie rods 21. The frames 11 and 11' are provided with flanged feet 12 and 12', respectively, which are secured by bolt studs 22 to slotted shoes 13 of the base plate 14 of the housing. But, in this connection, particularly in connection with the housing itself, any conventional design may be employed in combination with my invention, embodiments of which are hereinafter described.

In the embodiment of Figures 1 to 4, inclusive, I have provided a novel form of apparatus designated generally by the numeral 50, in order that a roll may have thrust support, and in order that the roll may be adjustable radially relative to the support and axially in conjunction with such support. Such adjustments in combination with the thrust support enable the production of shapes within a new range and quality. To effectively employ the above-mentioned embodiment of my invention, the working rolls 40 and 40a have a special neck construction at an end thereof. The latter includes a primary neck 43, an extending secondary neck 44 of a smaller diameter, and a tertiary neck 45 of the smallest diameter. The secondary and tertiary necks 44 and 45 may form part of the roll, see Fig. 4, or may be suitably connected thereto, see Fig. 5.

The apparatus 50 is adapted to be adjusted automatically to a roll setting and then to be rigidly, securely, and non-slidably mounted on the front face of the housing frame 11 by means of transversely projecting lugs 51 that are slotted at opposite ends thereof to receive bolts 52. Since, in the illustrative embodiments, I have employed the same type of apparatus, such as 50 for both the upper and lower rolls, I will describe the apparatus in connection with one of the rolls only, namely the upper roll 40.

The apparatus proper includes an outer-cylindrical auxiliary housing 53 which may, as shown, constitute an integral extension of the lateral face-plate 51 (see Fig. 2). Within the outer housing 53 is mounted a secondary, non-rotatable, and longitudinally slidable inner housing 55 which supports a thrust mechanism and a position-control apparatus. For ready accessibility and assembly, the housing 55 has been formed in multiple parts that are securely held together by bolts 56 and 57 in the manner shown, see Fig. 3.

In the drawings, the right-hand portion of this inner housing 55 supports a two-way thrust mechanism designated by the 60 numerals and the left-hand portion supports an automatic positioning or radial clearance-control mechanism designated by the 73–76 numerals.

Figure 3:
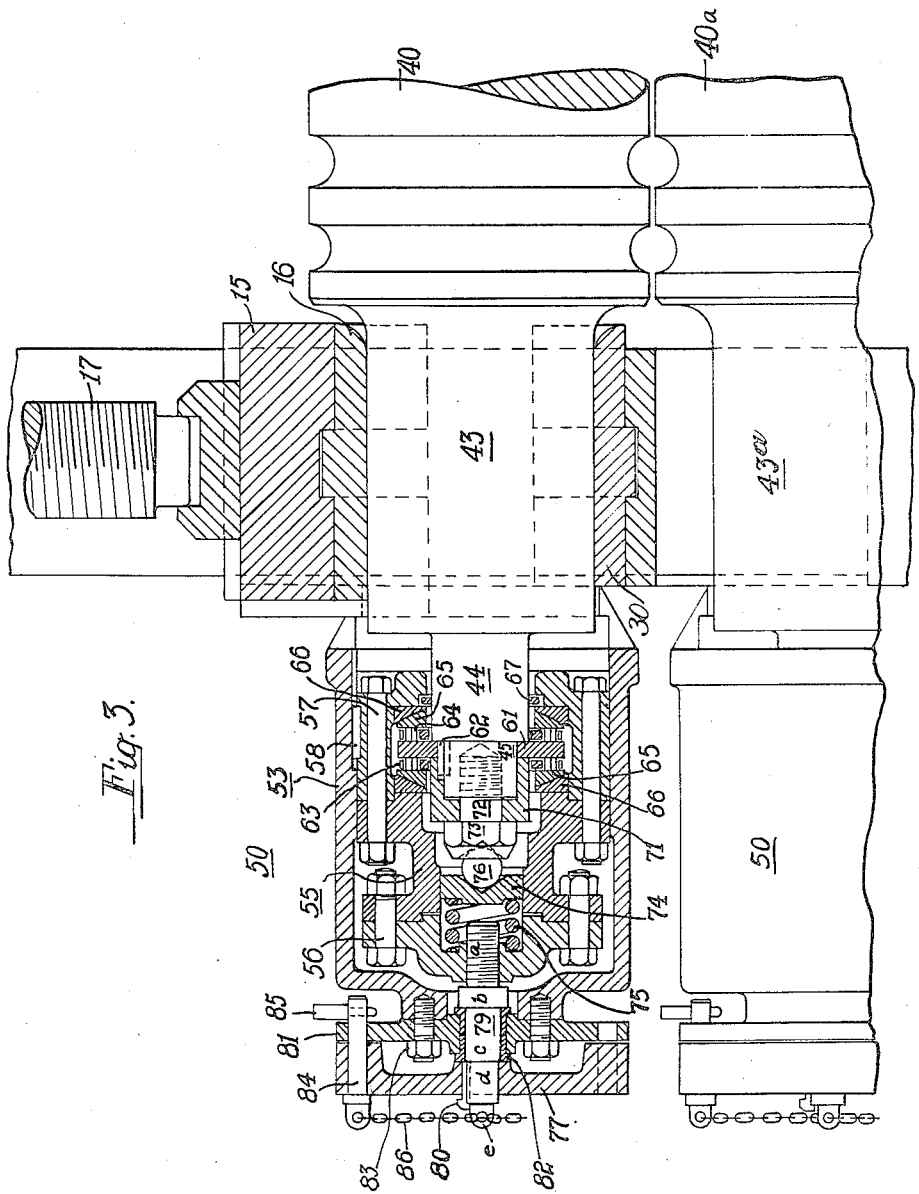
Figure 3 is an enlarged side elevational section taken along the line III—III of Fig. 1.

As particularly in the enlarged view of Fig. 3, a radially extending thrust flange 61 is secured to the tertiary roll neck 45 by suitable keys 62, and is held in place against a shoulder formed by the secondary roll neck 44. The right-hand portion of the inner housing 55 is chambered to receive this flange 61, to receive roller bearing cages 63 that are mounted on opposite sides of the faces of the thrust flange, and to receive between the outer faces of these oppositely-positioned roller cages and between inner shoulders of the housing, a pair of sets of complementarily circular thrust rings 65 and 66. Thrust resisting rollers 64 are held within the cages 63.

As will appear from the drawings, I have left a clearance between the outer radial edges of the thrust flange 61 and the inner chambered wall of the right-hand portion of the inner housing 55. This clearance corresponds to a predetermined take-up limit to be accomplished by a screwdown such as 17, when the brasses begin to wear. That is, this clearance corresponds to the permissible take-up of the roll brasses prior to their replacement by a new set.

As previously pointed out, certain thrust bearing parts may be provided with "ground" surfaces for aiding radial slide and for accomplishing such slide with a minimum of clearance between the associated parts. That is, in this instance, the slide surfaces of the parts 65 and of the rollers 64 may be ground to permit the latter to radially slide without bind with respect to the former, as when wear has occurred in the main radial brasses 16 and 30, and take up is to be accomplished by the screwdown 17.

Figure 5:
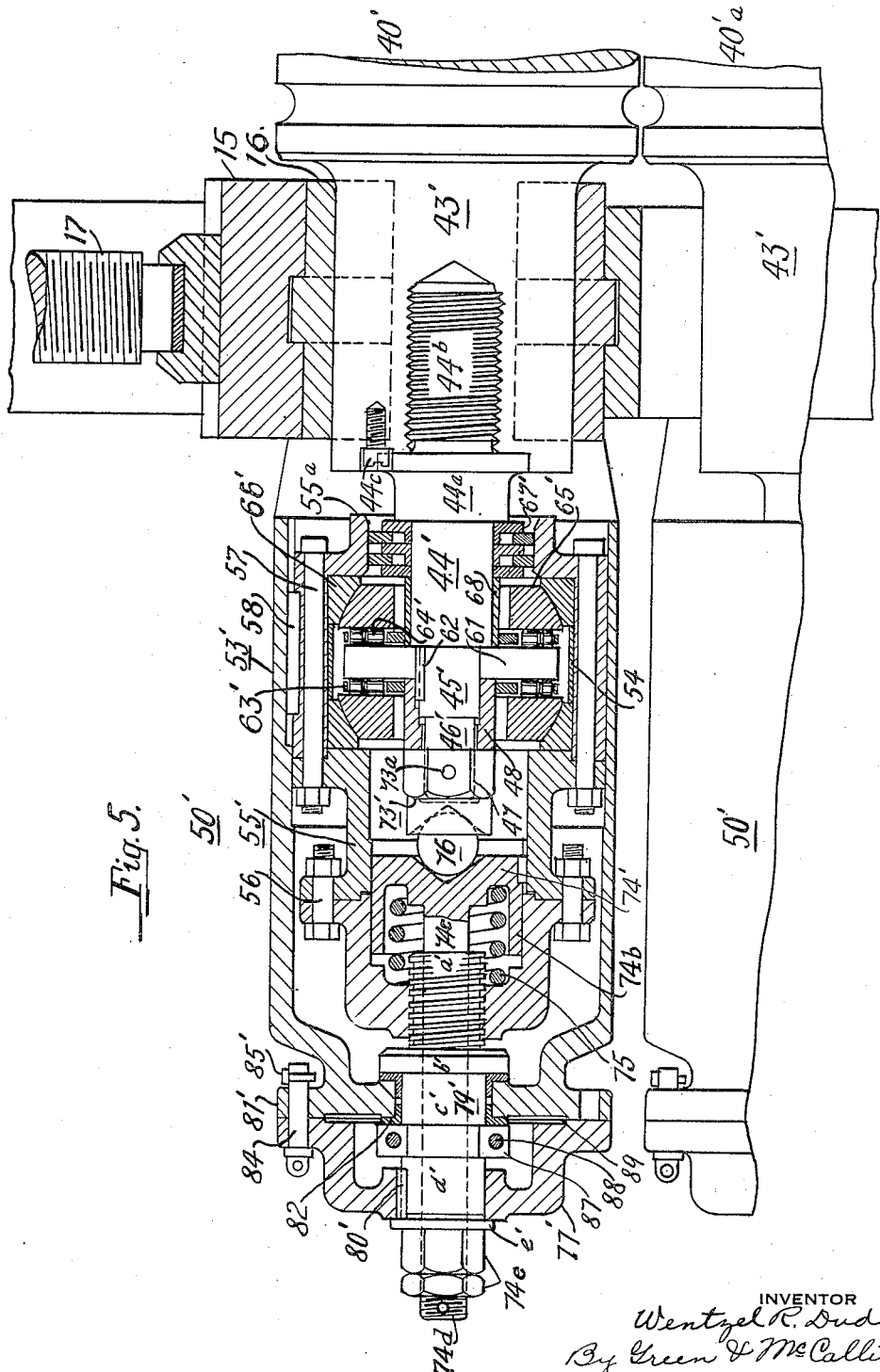
Fig. 5 is a view similar to Fig. 3, but showing another embodiment of my invention.

Changes in the construction of the two-way thrust mechanism are within the contemplation of my invention; and as pointed out below, features of the embodiment of adjusting apparatus shown in Fig. 5 may be substituted for their equivalents in the embodiment just described. In particular, spaced pairs of spherical thrust- and spacer-rings such as shown in Fig. 5 may be substituted for the pairs of rings 65 and 66.

I have shown a radial oil ring 67, adapted to ride on the secondary neck 44, in order to keep dirt, water, and scale out of and to hold oil in the thrust bearing parts.

I have mounted a positioning sleeve 71 on the end of the tertiary neck 45; this sleeve extends over the latter and abuts the front face of the thrust flange 61 to aid in holding the flange in position. The positioning sleeve 71 is securely held in place by means of an acorn head 73 of a screw stud 72 which is adapted to be screwed into the end of the tertiary roll neck 45 and to extend through a drilled out portion of the sleeve 71 to securely hold the latter in place upon the tertiary neck.

The left-hand portion of the inner or slidable housing 55 is also chambered in order to receive a center-thrust-guide plunger 74 and a spiral compression spring 75. As will be seen the end face of the acorn head 73 is beveled or angled out and the opposite and adjacent face of the center-thrust plunger 74 is also in a like manner beveled out to receive a center-thrust ball 76. The spiral compression spring 75 resiliently holds the plunger 74 against the ball 76, and in turn holds the ball against the head 73.

The pressure of the spiral compression spring on the plunger 74 compels the ball 76 to take up a centralized position in the beveled end of the acorn head 73, and at the same time to maintain the plunger 74 and its enclosing unit 55 in a centralized position with respect to the ball, during an assembly or mounting of the thrust apparatus 50 upon the roll housing frame 11. In consequence, the unit 55 is automatically adjusted radially with respect to the roll.

As a result of the automatic, radial alignment action of the control mechanism 73—76, I have made it possible to securely and rigidly mount the thrust bearing unit 50 upon the mill housing 11. Prior to the present invention, as previously pointed out, it has been necessary to leave a slide clearance between the thrust housing and the mill housing, in order that the thrust housing may move when the roll neck changes its position.

As is shown in the illustrative embodiment of my invention, the inner housing 55 is provided with outer slide surfaces which are adapted to move longitudinally within inner shoulder portions of the outer housing 53. And, in order to prevent any rotation of the inner housing 55 with respect to the outer housing and to at the same time permit longitudinal movement therebetween, I have provided a longitudinally extending key 58 mounted between complementarily slotted portions or keyways on the inner and outer housings.

In order that the apparatus 50 may be set to meet thrust requirements for a certain maximum and minimum range of axial roll neck adjustment, I have provided a circular shaped turnplate 77 that is securely mounted on the extending end $d$ of a regulator stud 79 by a key 80. The stud 79 is rotatably journaled within the bushing 82 carried in the end of housing 53. An end of the inner housing 55 is threaded to receive a threaded end $a$ of stud 79.

As shown, stud 79 has the threaded portion $a$, a shoulder portion $b$, a central or journal portion $c$, a key receiving shaft portion $d$, and an end portion $e$. A partial rotation of the turnplate 77 will rotate this stud and regulate the position of the inner housing 55 with respect to the outer housing 53. For locking the plate 77 in a set position, I have provided it with a plurality of radial holes and I have also provided an end plate 81 of the housing 53 with a plurality of radial holes for receiving a lock pin 84 therein. As seen, the end plate 81 may be removably mounted by suitable nut and bolt means 83. I have also shown a set pin 85 which may be mounted in an end slot of the lock pin 84 for preventing accidental withdrawal of the former after an adjustment has been made. The number of holes in the turn plate 77 is proportioned to the number in the end plate 81 of the housing 53 in such a manner that there will be an alignment between a pair of adjacent holes even when the turn plate 77 is rotated very slightly. This gives a hair-line vernier control.

As seen in Figure 1, a chain 86 is mounted on a stud 87 which projects from the turn plate 77; this chain extends through the slotted end of the lock pin 84, in order to prevent it from dropping to the floor and becoming lost when removed.

The operation of the apparatus 50 which includes mechanisms 60 and 73—76 will be briefly enumerated: When a given pair of rolls 40 and 40a are to be employed for a rolling operation, the vertical setting of the radial bearings for these rolls is first adjusted in the usual manner to obtain the desired positioning. Next, the complete inner thrust unit 55 is mounted on the extended end of the roll neck, the outer housing 53 is then mounted by means of the projecting lugs 51 upon the mill housing 11. After this has been done, the longitudinal adjustment of the roll may be accomplished. Rotation of the turn plate 77 in one direction will cause the inner housing 55 and roll 40 to slidably move in one direction and rotation in the other direction will cause the housing and roll to move in the opposite direction. After the desired setting has been obtained, lock pin 84 is thrust through cooperating holes in the turn plate 77 and end plate 81 of the housing 53. The mill is now ready for operation.

I have shown another illustrated embodiment of my invention in Fig. 5; and, in order to simplify a description thereof, I will distinguish parts that are common to both embodiments, but that are somewhat dissimilar, by prime suffixes.

It should be understood that apparatus 50' of the present embodiment may be interchanged with the apparatus 50 of the previously described embodiment and that the employment of all, or a part, of the features of one embodiment, or an interchange of those features, can be made without departing from the scope of the invention. Of course, one embodiment, or certain features may appear better suited than another to meet the needs of a given installation.

In the embodiment of Fig. 5, I have provided a stud-like roll neck auxiliary extension element or member, which, in terms of the roll neck 43', includes a secondary neck 44', a tertiary neck 45', and a quaternary neck 46'. In order that the entire extension member may be readily replaced, the secondary neck 44' is provided at one end thereof with a shank portion 44b threaded to be removably mounted within the end of the roll neck 43'. The neck portion 44' has also been provided with a central shoulder or spacer portion 44a which is flanged adjacent the shank portion 44b and is drilled out to receive a set screw 44c, in order that the shank portion may be securely locked in place.

The inner housing 55' is at one end thereof provided with an inwardly projecting end portion 55a having a face adapted to slidably receive an oil ring unit 67'. The unit 67' is mounted to permit longitudinal movement of the housing 55' with respect thereto and to permit radial and axial movement of the neck extension member. The inner portions of the oil ring unit 67' fit upon the circumference of the secondary neck 44' and are held in place at one end by a shoulder 44a, and at the other end by the thrust flange 61. The oil ring unit 67' includes a pair of outer rings held in a spaced relationship with respect to each other, a somewhat similar inner ring slidably mounted with respect to a face of a ring of such pair, a pair of inner rings having angle-like spacer portions, and a positioning flange 68. As appears from Fig. 5, the outer pair of oil rings are mounted in a slidable relationship with respect to the inner rings, and the inner rings serve to space the parts of the unit and to wipe the outer rings.

In this embodiment, I have provided opposite pairs of complementarily spherical thrust or spacer rings 65' and 66' which are especially adapted to permit radial and angular compensation of the thrust parts, if and when, the roll neck 43' moves or is moved, off center. A positioning sleeve 54 may be also provided to closely fit within a chambered portion of the inner housing 55' and to, at its opposite ends, abut and hold the outer thrust rings 66' in place. I have threaded an aligning center guide element, part, or member 73' upon a threaded end portion 47 of the quarternary neck 46, and it serves to hold a tubular part or member 48 in place against flange 61 and upon a portion of the key 62, the tertiary neck 45', and the quaternary neck 46. Element 73' may be locked in a given position by a pin-like key 73a which is adapted to extend radially through a hole in the acorn head of element 73' and through an aligned hole in the quaternary neck 46. Like the acorn head 73 of the previously described embodiment, its end face is beveled or angled out in order to receive the ball 76.

It should be noted that the roll bearing cages 63' of this embodiment do not rest directly upon the neck portions, as in the case of the previously described embodiment, but rest upon auxiliary members, which in the case of one cage, is the sleeve 68, and which in the case of the other cage, is the tubular part 48.

The plunger 74' is provided with rearwardly extending side projections 74b adapted to slide within the adjacent chambered portion of the inner housing 55'. In order that the plunger may be pulled back to compress the spring 75, after the complete unit 50' has been mounted upon the roll housing frame 11, I have provided an extending plunger rod 74c which is centrally and slidably mounted within a cylindrical regulator part 79'. Adjustment or lock nuts 74e are threaded on the end 74d of this rod and operate against a washer e'.

It will also appear that the end plate 81' is an extension of the outer housing 53'. The regulator part 79' consists of a threaded portion a' adapted to variably adjust the position of the inner housing 55', shoulder portion b', a journaled portion c', and an extending portion d' which is keyed to the turn plate 77'. I have mounted a two-part or split radial ring or flange 88 upon the portion d' which cooperates with the shoulder b' to hold part 79' in a rotatable relationship with respect to the outer housing 53'. The two-part ring 88 may be held together and mounted upon the portion d' by means of set screws 88.

Prior to operating the mill, the plunger 74' may be drawn back away from the end of element 73' by means of the nuts 74e, until the back face of the plunger 74' abuts against an end of the plunger chamber. This relieves the ball 76 of pressure due to the spring 75 and minimizes wear upon the centering parts during the operation of the rolling mill. This also locks the slidable inner housing 55' to the threaded portion a' of the regulator part 79'.

In the illustrated embodiments of my invention, the secondary roll neck 44 or 44', may be said to include the tertiary and/or the quaternary necks, and may be generally designated as a roll neck extension.

It will thus appear to those skilled in the art that I have contributed a novel manner of solving the problem of rolling rounds and other shapes to close tolerances. In solving this problem I bring into cooperation thrust resisting mechanism and a roll whereby adjustment in the thrust resisting mechanism shifts the roll along its axis. My novel combination has the advantage that one is able not only to align the grooves forming the roll pass, but also to make corrections from time to time so as to maintain a proper contour of the pass during rolling. Furthermore, the adjustment of the roll along its axis is made from a fixed or base point, namely the roll housing; and, nevertheless, sufficient clearance is provided in the thrust resisting mechanism so that the necessary running adjustment of the spacing of the rolls through the screw-down can be effected without causing bind in the fixedly mounted thrust resisting mechanism. A further important feature of my invention is the capability of varying the relationship of the parts so that the positioning of a pair of rolls axially relative to each other may be controlled for maintenance of proper registry of grooves therein irrespective of changes of the group positioning of the rolls with respect to their housings. It is to be understood that this invention applies to rolls operating in any desired position. The term "formed pass", moreover, is to be taken in the broad sense as descriptive of any contour of pass other than a flat pass.

While I have described certain embodiments of my invention, it will be apparent that many changes, modifications, substitutions, additions and omissions, or combinations thereof may be made in this apparatus without departing from the spirit and scope of the invention as indicated in the appended claims.

What I claim as new and desire to secure by Letters Patent is:

1. In a rolling mill including a mill housing, and rolls rotatably mounted in radial bearings therein, at least one of the rolls having a roll neck extension provided with opposed end thrust receiving surfaces, the combination with said roll neck extension of thrust bearings cooperating with said surfaces, mechanism mounting said thrust bearings, means for securing said mechanism to the mill housing, and a device for temporarily centering said mechanism and the roll neck extension until the mechanism is secured to the mill housing.

2. In a rolling mill including a mill housing, rolls rotatably mounted in radial bearings therein, and means for adjusting the spacing of the rolls, the combination with one of the rolls of thrust bearings, mechanism mounting said thrust bearings and adjusting the position thereof axially of the roll, means for securing said mechanism to the mill housing, and a device for temporarily centering said mechanism and the roll until the mechanism is secured to the mill housing.

3. In a rolling mill including a mill housing, rolls rotatably mounted in radial bearings therein, at least one of the rolls having a roll neck extension provided with opposed end thrust receiving surfaces, and means for adjusting the spacing of the rolls, the combination with said roll neck extension of thrust bearings engaging the opposed end thrust receiving surfaces, a housing carrying said thrust bearings, a support fixed to the mill housing and providing guideways for axial movement of the thrust bearing housing relative thereto, means for adjusting the position of the thrust bearing housing along said guideways, and means for temporarily centering the roll neck extension and the thrust bearing housing until said support is fixed to the mill housing.

4. In combination in a rolling mill, a mill housing, rolls rotatably mounted in the mill housing, at least one of said rolls having a roll neck extension provided with opposed end thrust receiving surfaces, thrust bearings cooperating with said opposed end thrust receiving surfaces, adjustable means fixed to the mill housing for supporting said thrust bearings and changing the position of the same to move the roll neck axially, and means for temporarily centering the roll neck extension and the thrust bearing housing until said adjustable supporting means is fixed to the mill housing.

5. In combination in a rolling mill, a mill housing, rolls rotatably mounted in the mill housing, at least one of said rolls having a roll neck extension provided with opposed end thrust receiving surfaces, a thrust bearing housing, thrust bearings therein cooperating with said opposed end thrust receiving surfaces, means fixed to the mill housing for adjustably supporting said thrust bearing housing and determining the position of the same axially of the roll extension, and temporary aligning means providing surfaces converging toward the axis of said thrust bearing housing for aligning said housing and said roll neck extension.

6. In combination in a rolling mill, a mill housing, rolls rotatably mounted in the mill housing, at least one of said rolls having a roll neck extension provided with opposed end thrust receiving surfaces, a thrust bearing housing, thrust bearings therein cooperating with said opposed end thrust receiving surfaces, means fixed to the mill housing for adjustably supporting said thrust bearing housing and determining the position of the same axially of the roll neck extension, and temporary aligning means comprising a device movable along the axis of said thrust bearing housing and providing surfaces converging toward said housing axis for aligning said housing and said roll neck extension and resilient means for pressing said device toward operative position.

7. In combination in a rolling mill, a mill housing, rolls rotatably mounted in the mill housing, at least one of said rolls having a roll neck extension provided with opposed end thrust receiving surfaces, a thrust bearing housing, thrust bearings therein cooperating with said opposed end thrust receiving surfaces, means fixed to the mill housing for adjustably supporting said thrust bearing housing and determining the position of the same axially of the roll neck extension, and temporary aligning means comprising a device movable along the axis of said thrust bearing housing and providing surfaces converging toward said housing axis for aligning said housing and said roll neck extension, resilient means for pressing said device toward operative position and means opposing said resilient means for retracting said device.

8. Adjusting mechanism for attachment to a rolling mill having mill housings and rolls mounted in radial bearings therein and cooperating to provide a formed pass, comprising a roll neck extension adapted to be secured to the neck of one of the rolls providing the formed pass, said extension having opposed thrust receiving surfaces, a support adapted to be fixedly secured to the mill housing adjacent thereto, and a thrust bearing unit adjustably carried by the support for movement axially of the roll, said unit including thrust bearings cooperating with the opposed thrust receiving surfaces of said roll neck extension and affording clearance for permitting radial movement of the respective roll neck extension, whereby the spacing of the roll of the mill connected to said extension may be adjusted without disturbing the position of said support on the mill housing, such adjusting mechanism having a reciprocable element for temporarily bringing the thrust bearing unit to a common center with the roll neck extension while the support is being secured to the mill housing.

WENTZEL R. DUDA.